(12) United States Patent
Grosshög et al.

(10) Patent No.: US 6,487,620 B1
(45) Date of Patent: Nov. 26, 2002

(54) COMBINED LOW SPEED AND HIGH SPEED DATA BUS

(75) Inventors: Jeppa Grosshög, Staffanstorp (SE); Lars Novak, Bjärred (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/330,401

(22) Filed: Jun. 11, 1999

(51) Int. Cl.$^7$ ................................................ G06F 13/00
(52) U.S. Cl. .......................... 710/107; 710/105; 710/60
(58) Field of Search ................................ 710/105–106, 710/60–61, 33–35, 107, 110; 709/233, 234

(56) References Cited

U.S. PATENT DOCUMENTS

| | | | |
|---|---|---|---|
| 4,028,666 A | * 6/1977 | Suzuki et al. ................. | 710/60 |
| 4,493,021 A | 1/1985 | Agrawal et al. | |
| 4,534,064 A | 8/1985 | Giacometti et al. ......... | 455/601 |
| 4,654,655 A | 3/1987 | Kowalski | |
| 4,885,741 A | 12/1989 | Douskalis | |
| 5,072,442 A | 12/1991 | Todd | |
| 5,727,171 A | 3/1998 | Iachetta, Jr. | |
| 5,809,291 A | 9/1998 | Munoz-Bustamante et al. | |
| 5,903,775 A | * 5/1999 | Murray ........................ | 710/33 |
| 6,151,648 A | * 11/2000 | Haq ............................ | 710/107 |
| 6,269,414 B1 | * 7/2001 | Engdahl ..................... | 710/101 |
| 6,311,245 B1 | * 10/2001 | Klein ......................... | 710/305 |

FOREIGN PATENT DOCUMENTS

| | | |
|---|---|---|
| AU | 199726906 B2 | 11/1997 |
| DE | 196 16 293 A1 | 10/1997 |

OTHER PUBLICATIONS

European Patent Office, Standard Search Report, Dec. 22, 1999.

* cited by examiner

Primary Examiner—Peter Wong
Assistant Examiner—Raymond N Phan
(74) Attorney, Agent, or Firm—Jenkens & Gilchrist

(57) ABSTRACT

A method and system for communicating at least two data transfers on a common bus. Data is communicated between a simple device and a system processor or system connector via the common bus at a low data rate, and data is communicated between a more complex device and the system processor or system connector via the common bus at a high data rate. Low data rate communications are conducted by selectively varying the voltage level on the common bus at least between a low voltage range and a high voltage range, wherein the low voltage range represents a first data value and the high voltage range represents a second data value. High data rate communications can be conducted, simultaneous with the low data rate communications, by selectively varying the voltage level on the common bus at least between two voltage sub-levels within the low voltage range and between two voltage sub-levels within the high voltage range.

23 Claims, 2 Drawing Sheets

COMBINED LOW SPEED AND HIGH SPEED DATA BUS

BACKGROUND OF THE INVENTION

1. Technical Field of the Invention

The present invention relates in general to a system and method for communicating data, and in particular for simultaneously communicating data between multiple devices on a shared data bus.

2. Description of Related Art

Different electronics devices communicate data at different rates. Generally, the data rate for a particular device is dependent upon how advanced the device is and upon the rate of data exchange that is required for proper operation of the device. For example, low-cost electronics accessories typically operate at a low data rate and use a simple electrical interface. More advanced accessories, on the other hand, frequently require the use of electrical data buses that can support high data rates.

Many products and systems that incorporate electronic accessories, such as cellular telephones, include a number of interconnected devices, which can have varying levels of complexity. Some of the more complex devices must operate at high data rates while many of the simpler devices are incapable of operating at a high data rate. As a result, such systems or products typically require two or more electrical data buses to support communications with the various devices of the particular system or product, increasing space requirements and cost. The use of multiple data buses also requires a greater number of connector pins on system connectors and processors that control the system or product, which also takes up more space and adds expense.

There is a need, therefore, for a system and method for communicating data to and from both high-speed devices and low-speed devices using a common electrical bus. Such a system and method would reduce the space and the number of connector pins required to interconnect multiple devices having the same or differing data rates. In addition, such a system and method would preferably permit the simultaneous use of the common electrical data bus for both high-speed and low-speed data transfers.

SUMMARY OF THE INVENTION

The present invention comprises a method and system for communicating at least two data transfers on a shared data bus. The system includes a simple electronic device that communicates via the shared data bus at a low data rate and a high-speed electronic device that communicates via the shared data bus at a high data rate. Alternatively, two devices can transmit data via the data bus at the same time using the same data rate. Generally, the shared data bus is also connected to a system processor, system connector, and/or other high-speed or low-speed devices.

Communications at the low data rate are conducted by varying a voltage level on the shared data bus within the full voltage swing of the shared data bus. The full voltage swing is divided into at least a low voltage range and a separate high voltage range. A voltage level on the shared data bus that is within the low voltage range represents a first data value, such as a binary value of zero, and a voltage level on the shared data bus that is within the high voltage range represents a second data value, such as a binary value of one. Thus, devices can communicate via the shared data bus at the low data rate by selectively varying the voltage level between at least the low voltage range and the high voltage range.

At the same time as communications at the low data rate are ongoing, communications at the high data rate can also be conducted by varying the voltage level within either the low voltage range or the high voltage range, depending on which data value is currently being transmitted at the low data rate. Accordingly, the low voltage range and the high voltage range are each divided into sub-levels or sub-ranges. Thus, when a device communicating at the low data rate is transmitting the first data value (i.e., within the low voltage range), a high-speed device can simultaneously transmit data at the high data rate by varying the voltage level between sub-levels within the low voltage range. Similarly, when a device communicating at the low data rate is transmitting the second data value (i.e., within the high voltage range), a high-speed device can simultaneously transmit data at the high data rate by varying the voltage level between sub-levels within the high voltage range.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
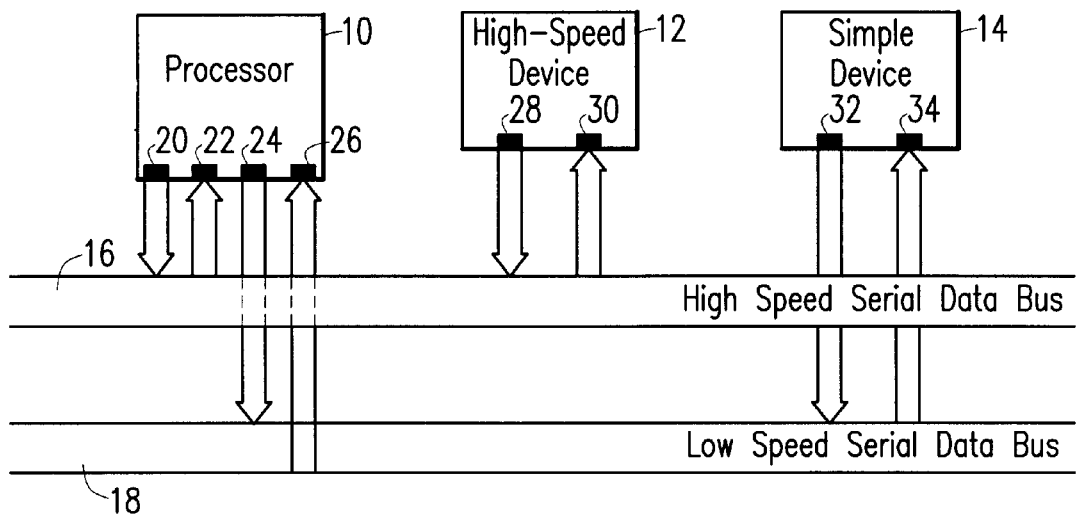
FIG. 1 is an arrangement of interconnected devices that operate at different rates of data transfer, as can be found in existing products and systems.

Reference is now made to the Drawings wherein like reference characters denote like or similar parts throughout the various Figures. Referring now to FIG. 1, there is illustrated an arrangement of interconnected devices that operate at different rates of data transfer, as can be found in existing products and systems. The arrangement includes a high-speed device 12 that transmits and receives data over a high speed serial data bus 16 at a high data rate. The high-speed device 12 communicates with a processor 10 or system connector (not shown) via the high speed serial data bus 16. In addition, the high-speed device 12 can communicate via the high speed serial data bus 16 with other devices (not shown) that are capable of operating at a high data rate.

The arrangement also includes a simple device 14 that is not capable of operating at a high data rate. Instead, the simple device 14 requires a separate low speed serial data bus 18 to transmit and receive data. The simple device 14 communicates with the processor 10 via the low speed serial data bus 18 and can also communicate, again via the low speed serial data bus 18, with other devices (not shown) that are capable of transmitting and/or receiving information at a low data rate. Furthermore, the processor 10 can send information that is received from the simple device 14 to the high-speed device 12 by sending the received data at a faster rate over the high speed serial data bus 16. Similarly, the processor 10 can also transform data received from the high speed device 12 for transmission to the simple device 14.

Because it is desirable to have the capability to operate in a full duplex mode, wherein data can be simultaneously sent and received over the high speed serial data bus 16 or the low speed serial data bus 18, the processor 10 (and any other devices capable of using both the high speed serial data bus 16 and the low speed serial data bus 18) must include two pins for each serial data bus 16 and 18. Thus, the processor 10 must include an output pin 20 for transmitting data over the high speed serial data bus 16 and an input pin 22 for receiving data from the high speed serial data bus 16. The high speed device 12 includes corresponding output and input pins 28 and 30 so that it too can support full duplex operation.

In addition, to support low speed data communications as well, the processor 10 must further include an output pin 24 for transmitting data over the low speed serial data bus 18 and an input pin 26 for receiving data from the low speed serial data bus 18. The low speed device 14 also includes corresponding output and input pins 32 and 34 for supporting full duplex operation. If one or more additional serial data buses having other rates of data exchange are also handled by the processor 10, then additional pairs of input and output pins might also be required for connecting the processor 10 to the additional data buses. The need for two separate data buses and for four connector pins on the processor 10 and other system connectors (not shown), however, increases the space requirements for, and increases the cost associated with, constructing a product or system that uses both high-speed and low-speed components.

Figure 2:
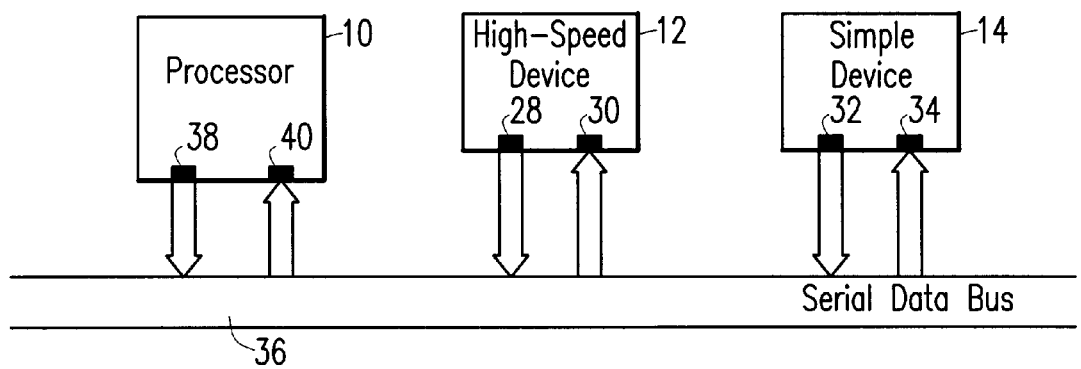
FIG. 2 is an arrangement of interconnected devices that operate at different rates of data transfer and that use a shared data bus, in accordance with the present invention.

Referring now to FIG. 2, however, there is illustrated an arrangement of interconnected devices that operate at different rates of data transfer and that use a shared data bus 36, in accordance with the present invention. In this arrangement, a high-speed device 12 and a low-speed device 14 are incorporated in an interconnected system or product using a shared data bus 36. As in the arrangement of FIG. 1, the invention permits full duplex operation because each device 10, 12, and 14 includes separate input and output connector pins. Because only one data bus 36 is used, however, the processor 10 (or other system connector) only requires one output connector pin 38 and one input connector pin 40 instead of the four connector pins used in the arrangement of FIG. 1.

Using the output connector pin 38, the processor 10 can transmit data via the shared data bus 36 at both a high data rate and a low data rate by using distinguishable, but overlapping, encoding methods, as described below. In particular, the data transmitted at a high data rate is superimposed on the data transmitted at a low data rate. Thus, the processor 10 can transmit data to the high-speed device 12 by sending the data at a high data rate from the output connector pin 38 onto the shared data bus 36. The high-speed device 12 then receives the transmitted data at its input connector pin 30. The processor 10 can also transmit data to the simple device 14 by sending the data at a low data rate from the same output connector pin 38 onto the-shared data bus 36. The simple device 14 then receives the transmitted data at its input connector pin 34.

Similarly, the processor 10 can receive data that is transmitted via the shared data bus 36 at both a high data rate and a low data rate using the input connector pin 40. In particular, the high-speed device 12 can send data at a high data rate from its output connector pin 28 and onto the shared data bus 36. The processor 10 receives the data transmitted from the high-speed device 12 at the processor's input connector pin 40. The simple device 14 can also transmit data to the processor 10 by sending the data at a low data rate from the simple device's output connector pin 32 onto the shared data bus 36. The processor 10 then receives the transmitted data at its input connector pin 40. Thus, data communications can be conducted using a single shared data bus 36 and shared input and output connector pins 38 and 40 at the system processor 10.

Figure 3:
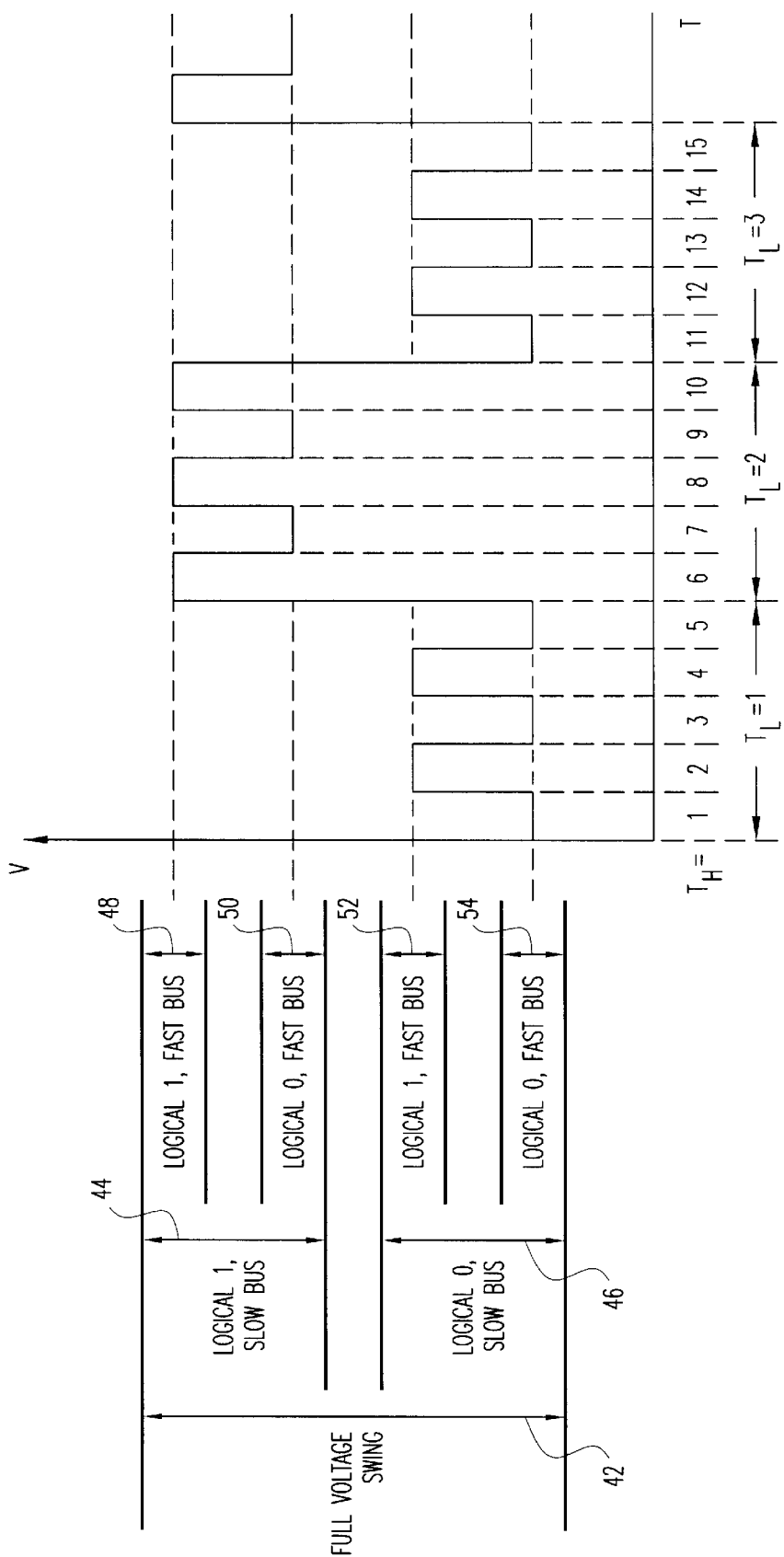
FIG. 3 is a graph illustrating an exemplary data transmission on a shared data bus using both a high data rate and a low data rate in accordance with the present invention.

Referring now to FIG. 3, there is depicted a graph illustrating an exemplary data transmission using both a high data rate and a low data rate in accordance with the present invention. To transmit data communications on the shared data bus 36 (see FIG. 2), a transmitting device varies a voltage level on the shared data bus 36. The voltage is varied within a full voltage swing 42, which ranges, for example, between a minimum voltage of 0 V and a maximum of 100 mV. In such a system, a high voltage level typically represents a binary value of one, and a low voltage level represents a binary value of zero. Alternatively, a high voltage level can represent a binary value of zero, and a low voltage level can represent a binary value of one.

In accordance with the present invention, the full voltage swing 42 is used for transmitting data at the low data rate, but rather large variations in the voltage levels that represent the respective binary values of zero and one are permitted. In other words, a voltage level that is anywhere within a high voltage range 44 represents a logic value of one for purposes of transmitting data at the low data rate, and a voltage level that is anywhere within a low voltage range 46 represents a logic value of zero for purposes of transmitting data at the low data rate. Three full time slots (i.e., $T_L$=1, 2, and 3) for transmitting data at the low data rate are depicted in FIG. 3. Despite the relatively wide variation of voltage levels within each time slot $T_L$, the voltage level remains within one of the particular voltage ranges 44 and 46 for an entire time slot $T_L$ and thus the transmitted data has a logical value of zero for the entire time slot $T_L$=1, a logical value of one for $T_L$=2, and a logical value of zero for $T_L$=3.

Although the data transmission is shown as oscillating between high and low voltages, the voltage level in actual use will not generally follow a set pattern but will depend upon the data value to be transmitted at each time slot $T_L$. In the preferred embodiment, as illustrated, data is transmitted as a binary code. Accordingly, only two different voltage ranges 44 and 46 are used. As an alternative, however, data can be encoded in more than two values per time slot $T_L$ by dividing the full voltage swing 42 into greater numbers of voltage ranges, wherein each voltage range corresponds to a different value.

To transmit data at a high data rate, shorter time slots $T_H$ are used. In addition, the high voltage range 44 that is used for low data rate transmissions is further divided into two voltage sub-ranges—a high sub-range 48 and a low sub-range 50. The high sub-range 48 of the high voltage range 44 represents a logic value of one for purposes of transmitting data at the high data rate, while the low sub-range 50 of the high voltage range 44 represents a logic value of zero for purposes of transmitting data at the high data rate. Similarly, the low voltage range 46 that is used for low data rate transmissions is also further divided into two voltage sub-ranges--a high sub-range 52 and a low sub-range 54. The high sub-range 52 of the low voltage range 46 represents a logic value of one for purposes of transmitting data at the high data rate, while the low sub-range 54 of the low voltage range 46 represents a logic value of zero for purposes of transmitting data at the high data rate. By varying the voltage levels on the shared data bus 36 between sub-ranges 48 and 50 or sub-ranges 52 and 54, depending on whether the low data rate transmission is high or low at a particular time, data can be transmitted over the shared data bus 36 at a high data rate at the same time as different data is being transmitted over the shared data bus 36 at a low data rate. Data can, therefore, be transmitted at two different data rates simultaneously. Alternatively, instead of using entire sub-ranges, specific voltage levels within each of the voltage ranges 44 and 46 can be used to represent the binary values.

As illustrated in FIG. 3, the high data rate is five times faster than the low data rate. Accordingly, during the same period of time in which three time slots (i.e., $T_L$=1, 2, 3) of low data rate transmissions elapse, fifteen time slots (i.e., $T_H$=1, 2, 3, . . ., 15) of high data rate transmissions elapse. This five to one ratio, however, is used only for purposes of illustration; in accordance with the invention, virtually any ratio of the high data rate to the low data rate can be used.

Also as shown in the figure, the data transmitted at the high data rate has a logical value of zero at $T_H$=1, a logical value of one at $T_H$=2, a logical value of zero at $T_H$=3, and so on. These values are transmitted by varying the voltage level on the shared data bus between the low sub-range 54 of the low voltage range 46 and the high sub-range 52 of the low voltage range 46. Then, at time slot $T_H$=6, the voltage level on the shared data bus 36 is changed from the low voltage range 46 to the high voltage range 44, in accordance with a change in the value of the data bit being transmitted at the low data rate. The high data rate transmission, however, continues on uninterrupted by varying the voltage level between the high sub-range 48 of the high voltage range 44 and the low sub-range 50 of the high voltage range 44. Thus, the high data rate has a logical value of one at $T_H$=6, a logical value of zero at $T_H$=7, a logical value of one at $T_H$=8, and so on. Although the high data rate transmission is shown as alternating between a logical zero and logical one, the voltage level in actual use will not generally follow a set pattern but will depend upon the value to be transmitted at each time slot. Furthermore, although the high data rate transmission is preferably conducted using binary values, data can also be transmitted using more than two values by dividing each low data rate voltage range into a greater number of sub-ranges, wherein each sub-range represents a different value.

In accordance with an alternative embodiment of the invention, the fast data rate transmissions can be made by varying the voltage between different levels of the full voltage swing, while data can be transmitted at a slow data rate by varying the voltage level between sub-levels within each of the full voltage swing levels. In yet another embodiment of the invention, it is possible to use the same data rate for two different data transmissions. In other words, data that is sent using different levels of the full voltage swing can be sent at the same rate as data that is sent using sub-levels within the full voltage swing levels.

Using the present invention, it is possible to implement a slow, simple serial interface and a faster more elaborate interface on a single, shared data bus 36. The simple device 14, for example, can comprise a simple electronics accessory. Little or no modification to the device 14 is necessary to enable it to operate in accordance with the invention because the high data rate traffic on the shared data bus 36 essentially constitutes only a minor, but inconsequential, disturbance on the low data rate transmissions. On the other hand, the electronics for the high-speed device 12 will be more complex because the high-speed device 12 must be capable of detecting and transmitting data signals using at least four different voltage levels. This type of capability, however, will ordinarily be more affordable in more advanced accessories.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for communicating at least two data transfers on a common bus, said method comprising the steps of:

assigning a first value to a first signal range and a different, second value to a separate, second signal range;

transmitting data at a first data rate by varying a signal on the common bus using at least the first signal range and the second signal range;

assigning a value to each of: (i) a first sub-range of the first signal range, (ii) a first sub-range of the second signal range, (iii) a second sub-range of the first signal range, and (iv) a second sub-range of the second signal range; and transmitting data at a second data rate by varying a signal on the common bus using at least the first sub-range of the first signal range, the first sub-range of the second signal range, the second sub-range of the first signal range, and the second sub-range of the second signal range.

2. The method of claim 1, wherein said first data rate is greater than said second data rate.

3. The method of claim 1, wherein said first data rate is the same as said second data rate.

4. The method of claim 1, wherein said second data rate is greater than said first data rate.

5. The method of claim 4, wherein said first signal range comprises a first range of voltages on the common bus and said second signal range comprises a second range of voltages on the common bus.

6. The method of claim 5, wherein the step of transmitting data at the first data rate comprises transmitting binary data, the first range of voltages representing a logic value zero and the second range of voltages representing a logic value one.

7. The method of claim 6, wherein the first data rate is defined by a plurality of time slots and one binary value is transmitted for each time slot.

8. The method of claim 6, wherein the first sub-range of the first signal range and the second sub-range of the first signal range comprise two distinct subsets within the first range of voltages, and the first sub-range of the second signal range and the second sub-range of the second signal range comprise two distinct subsets within the second range of voltages.

9. The method of claim 8, wherein the step of transmitting data at the second data rate comprises transmitting binary data, the first sub-range of the first range of voltages and the first sub-range of the second range of voltages representing a logic value zero, and the second sub-range of the first range of voltages and the second sub-range of the second range of voltages representing a logic value one.

10. The method of claim 9, wherein the second data rate is defined by a plurality of time slots and one binary value is transmitted for each time slot.

11. The method of claim 10, further comprising the step of concurrently transmitting data at the first data rate and the second data rate.

12. The method of claim 5, wherein the first sub-range of the first signal range and the second sub-range of the first signal range comprise two distinct subsets within the first range of voltages, and the first sub-range of the second signal range and the second sub-range of the second signal range comprise two distinct subsets within the second range of voltages.

13. The method of claim 12, further comprising the step of concurrently transmitting data at the first data rate and the second data rate.

14. A data communications system, comprising:

a shared data bus;

a first electronic device coupled to the shared data bus for transmitting data via the shared data bus at a first data rate by varying the voltage level on the shared data bus, the first electronic device using at least a voltage level within a first voltage range to represent a first value and a voltage level within a second voltage range, different from the first voltage range, to represent a second value; and a second electronic device coupled to the shared data bus, the second electronic device communicating data via the shared data bus at a second data rate by varying the voltage level on the shared data bus within the first voltage range when the first electronic device is transmitting the first value and by varying the voltage level on the shared data bus within the second voltage range when the first electronic device is transmitting the second value.

15. The data communications system of claim 14, wherein the second data rate is faster than the first data rate.

16. The data communications system of claim 14, wherein the second data rate is the same as the first data rate.

17. The data communications system of claim 14, wherein the first electronic device comprises a system connector.

18. The data communications system of claim 14, wherein the first electronic device comprises a processor.

19. The data communications system of claim 14, wherein the second electronic device communicates data by varying the voltage level on the shared data bus within the first voltage range between at least a first voltage sub-range representing a third value and a second voltage sub-range representing a fourth value, and by varying the voltage level on the shared data bus within the second voltage range between at least a third voltage sub-range representing the third value and a fourth voltage sub-range representing the fourth value.

20. The data communications system of claim 19, wherein the first value defines a logical zero for communications at the first data rate and the second value defines a logical one for communications at the first data rate.

21. The data communications system of claim 20, wherein the third value defines a logical zero for communications at the second data rate and the fourth value defines a logical one for communications at the second data rate.

22. The data communications system of claim 14, wherein the first electronic device comprises a low-speed device and the second electronic device comprises a high-speed device.

23. A method for communicating at least two data transfers on a common electrical bus, said method comprising the steps of:

transmitting data at a first data rate by varying a voltage on the common electrical bus between at least a first voltage range and a different, second voltage range, wherein said first voltage range represents a first value and the second voltage range represents a second value;

transmitting data at a second data rate by varying a voltage on the common electrical bus between at least a first sub-range of the first voltage range and a second sub-range of the first voltage range when the voltage on the common electrical bus is within the first voltage range, and by varying a voltage on the common electrical bus between a first sub-range of the second voltage range and a second sub-range of the second voltage range when the voltage on the common electrical bus is within the second voltage range, wherein said second data rate is faster than said first data rate.

* * * * *

UNITED STATES PATENT AND TRADEMARK OFFICE
CERTIFICATE OF CORRECTION

| | | |
|---|---|---|
| PATENT NO. | : 6,487,620 B1 | Page 1 of 1 |
| APPLICATION NO. | : 09/330401 | |
| DATED | : November 26, 2002 | |
| INVENTOR(S) | : Jeppa Grosshög and Lars Novak | |

It is certified that error appears in the above-identified patent and that said Letters Patent is hereby corrected as shown below:

Title page of Patent [54]    delete "COMBINED LOW SPEED AND HIGH SPEED DATA BUS" and replace with –

-- "SHARED DATA BUS FOR SIMULTANEOUS LOW RATE AND HIGH RATE COMMUNICATIONS" --

Signed and Sealed this

Seventeenth Day of July, 2007

JON W. DUDAS
*Director of the United States Patent and Trademark Office*